United States Patent [19]

Koizumi et al.

[11] 4,097,781

[45] Jun. 27, 1978

[54] ATOMIC SPECTRUM LIGHT SOURCE DEVICE

[75] Inventors: Hideaki Koizumi; Yoji Arai, both of Katsuta; Seiichi Murayama, Kokubunji, all of Japan

[73] Assignee: Hitachi, Ltd., Japan

[21] Appl. No.: 635,080

[22] Filed: Nov. 25, 1975

[30] Foreign Application Priority Data

Nov. 27, 1974 Japan ................................ 49-135506

[51] Int. Cl.[2] ................................................ G01J 3/12

[52] U.S. Cl. .................................... 315/176; 313/161; 315/174; 315/344; 356/85

[58] Field of Search ............... 315/160, 163, 162, 267, 315/165, 166, 168, 209 SC, DIG. 7, DIG. 2, DIG. 5, 171, 176, 172, 344, 348, 170, 174; 313/161, 163, 209, 210, 214, 216, 217; 356/87, 85, 89

[56] References Cited

U.S. PATENT DOCUMENTS

| | | | |
|---|---|---|---|
| 2,015,885 | 10/1935 | Dallenbach | 315/174 X |
| 2,445,782 | 7/1948 | Kruithof et al. | 315/163 |
| 2,920,234 | 1/1960 | Luce | 315/176 X |
| 2,920,235 | 1/1960 | Bell et al. | 315/176 X |
| 2,930,233 | 8/1958 | Halus et al. | 315/163 |
| 3,089,054 | 5/1963 | Walsh et al. | 313/209 |
| 3,335,311 | 8/1967 | Kim | 315/344 |
| 3,610,760 | 10/1971 | Lowe | 356/87 |
| 3,623,136 | 11/1971 | Tomita et al. | 356/85 |
| 3,676,004 | 7/1972 | Prugger et al. | 356/87 |
| 3,893,768 | 7/1975 | Stephens | 313/209 |

OTHER PUBLICATIONS

Some Intense Sources of Radiation for the Alkali and Alkaline Earth Element, Spectrochimica Acta, vol. 22B, pp. 51-63 (1973).

The Application of Cathodic Sputtering to the Production of Atomic Vapour in Atomic Fluorescence Spectroscopy, Spectrochimica Acta, vol. 28B, pp. 197-210, (Percamon Press. 1973).

*Primary Examiner*—Eugene R. LaRoche

*Attorney, Agent, or Firm*—Craig & Antonelli

[57] ABSTRACT

An anode and a cathode are disposed in an opposing relation in a tubing in which an inactive gas is enclosed to form a discharge lamp by which an atomic spectrum is emitted. The cathode contains atomic spectrum emitting elements also serving to form the material of cathode. The discharge lamp is supplied with a high frequency power from a high frequency source and simultaneously with a direct current power from a direct current source. This causes the direct current discharge and high frequency discharge to be effected between a pair of electrodes in a superimposed manner. The atoms sputtered by the direct current are efficiently excited by the application of the high frequency with the result that atomic spectra with high brightness are obtained.

15 Claims, 8 Drawing Figures

ATOMIC SPECTRUM LIGHT SOURCE DEVICE

BACKGROUND OF THE INVENTION

The present invention relates to a light source device, and move particularly to a light source device adapted for use in atomic light absorption analyses, atomic fluorescent analyses or luminous analyses. In atomic light absorption analyses, for example, constituent elements to be measured in samples are changed into atomic states, and the elements changed into the atomic states are then irradiated with an atomic spectrum having particular wavelengths to measure a light absorption and the amount of the elements corresponding to its light absorption. Such light sources from which the atomic spectrum is emitted are used not only in the atomic light absorption analyses but also in the atomic fluorescent analyses or luminous analyses. Conventionally, hollow cathode lamps or high frequency non-polar discharge lamps are used as the light source for emitting the atomic spectroum.

In the hollow cathode lamp, accelerated electrons collide with sputtered metal which has been attached to the cathode and emit an atomic spectrum. The hollow cathode lamp makes it possible to increase the light amount to some degree by increasing current for causing the glow discharge. This, however, causes the self-absorption to increase with the increase in the discharge current with the result of the generation of great heat, so that the expected high brightness and therefore luminous lines causing high sensitivity cannot be obtained.

The high frequency non-polar discharge lamp, on the other hand, does not cause an increase of the self-absorption even if the high frequency energy is increased. It is, however, difficult to obtain an atomic spectrum with the exception of elements such as mercury or cadmium which have a high atomic vapor pressure at a relatively low temperature.

SUMMARY OF THE INVENTION

The present invention provides a light source device with a discharge lamp having a pair of electrodes therebetween, to which a low frequency power is supplied which has an alternating period longer than the flight time of ions between both the electrodes to sputter atoms in the discharge lamp, and to which a high frequency power is also supplied to make the sputtered atoms luminous. In the present invention the low frequency power further comprises a direct current power.

In a preferred embodiment according to the present invention the high frequency power is continuously supplied to the electrodes of the discharge lamps simultaneously with the intermittent supply of the direct current power. This causes an intermittent emission of the atomic spectrum.

One object of the present invention is to provide a light source device capable of producing an atomic spectrum with great brightness.

Another object of the present invention is to provide a light source device capable of easily producing an atomic spectrum with great light intensity relative to metals with a high melting point.

Another object of the present invention is to provide a light source device capable of making a separate adjustment for the sputtering amount and luminous intensity of the atomic spectrum.

Another object of the present invention is to provide a light source device capable of exciting sputtered atoms efficiently.

Still another object of the present invention is to provide a light source device capable of making a measurement with high sensitivity for use in the analysis of samples.

Another object of the present invention is to provide a light source device capable of reducing noise due to the intermittence of luminous lines.

Still another object of the present invention is to provide a light source device capable of emitting a pulse spectrum and adapted for use in time resolved measurements.

Another object of the present invention is to provide a light source device adapted for use in a light source of devices for analyzing a Zeemann atomic light absorption.

DESCRIPTION OF THE PREFERRED EMBODIMENTS

Figure 1A:
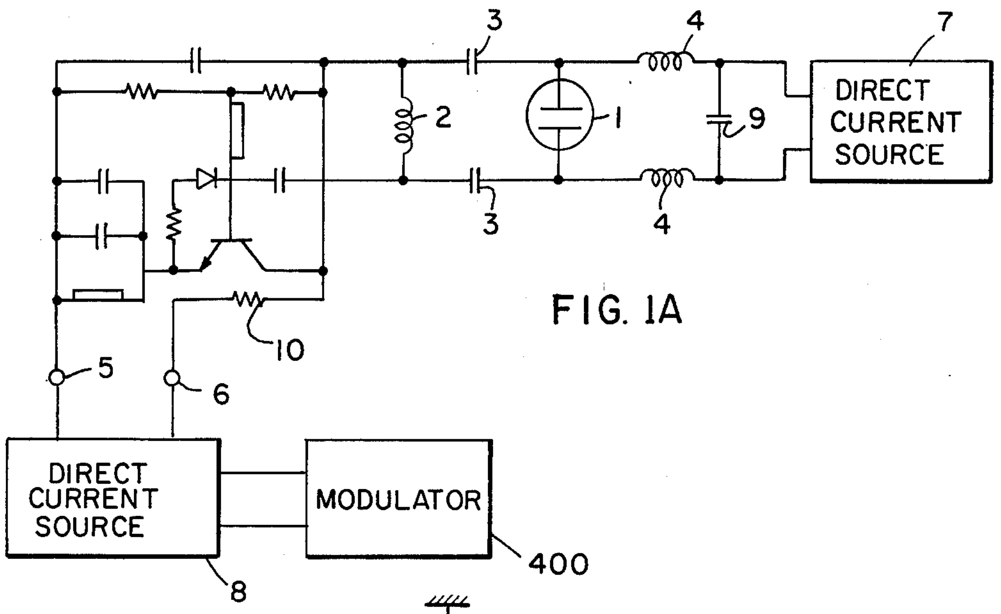
FIGS. 1A and 1B are electric circuit diagrams of embodiments according to the present invention.

In a discharge tube of a light source device according to the present invention, the direct current glow discharge or abnormal glow discharge is maintained to cause a sputtering phenomenon. Either one of the field of direct current or low frequency, and the field of high frequency are formed between the anode and cathode of the discharge tube. Electrons travel from the cathode to anode and are simultaneously vibrated fractionally by the electric field of high frequency. The electrons collide with enclosed inactive gaseous atoms in the path and ionize them. Positive ions generated are accelerated primarily by the electric field of direct current and collide with the surface of the cathode. This collision causes substances on the cathode to be sputtered. The sputtered substances on the cathode are excited by the electric fields of high frequency and direct current, thereby emitting the atomic spectrum.

It depends on the frequency as to how much influence the high frequency energy has on the emission of a spectrum and sputtering. In other words, the sputtering occurs at a frequency so low that the ion entrapment does not occur. The sputtering handly occurs at the frequency so high that the ion entrapment occurs, but the electrons can reach the anode and vanish due to causes other than free diffusion.

Sputtering never occurs at a frequency higher than the frequency at which the electron entrapment occurs and the electrons are absorbed into the wall of the tube or electrode due to the free diffusion. The high frequency at which the electron entrapment occurs is practically more than about 1 MHz, although it depends on the distance between the electrodes, pressure of enclosed gas and so on. In the present invention, therefore, the frequency of the electric field supplied from the high frequency source to the discharge tube is more than 1 MHz.

The sputtering of the atom to be made luminous is made by supplying the direct current power or low frequency power to the discharge tube. The low frequency having a period longer than a required time of ions flying between the electrodes can be used similarly to the direct current with regards to the sputtering. The frequency of the low frequency power used in the present invention is less than 1 kilo Hz. The sputtered atoms are excited very efficiently in the discharge tube according to the present invention because the electrode for the direct current discharge serves also as the electrode for the high frequency discharge. In the present invention, the adjustments in connection with the generation of atomic vapor and luminous intensity can separately be made by controlling two light sources, respectively. The current causing the sputtering may be smaller than conventionally because one need not increase the luminous intensity as in the conventional hollow cathode lamps. The self-absorption of the atomic spectrum does not occur at the intensity of current required to obtain the necessary sputtering. The luminous intensity increases if the high frequency power increases at the frequency at which the electrons are entrapped. This, however, does not cause heat to develop at the electrodes or the self-absorption to occur.

Figure 1B:
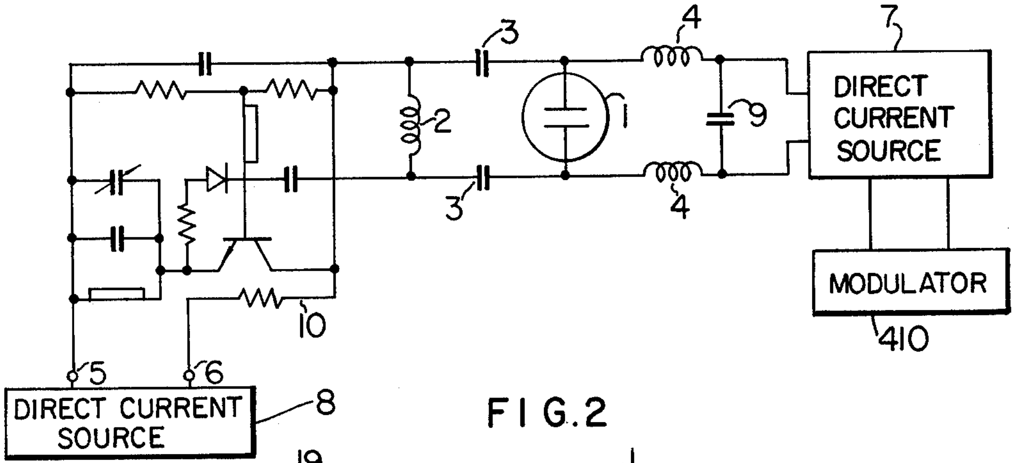
Figure 2:
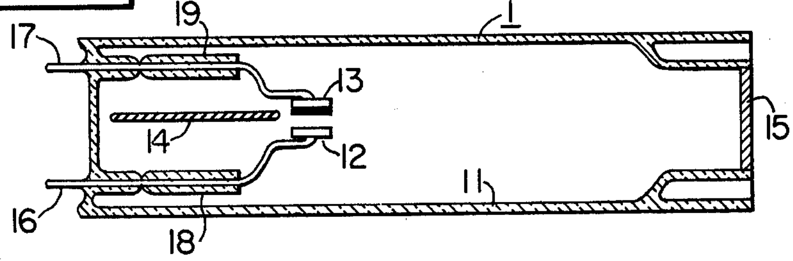
FIG. 2 is a schematic cross-sectional view showing the structure of a discharge tube used in the embodiments of FIGS. 1A and 1B.

Referring to FIGS. 1A, 1B and 2, an embodiment according to the present invention will be described. A circuit 10 shown at the left side of FIGS. 1A and 1B is a high frequency oscillator of 100 MHz. The circuit 10 operates when its terminals 5 and 6 receive a direct current input of 1 to 15 watts from a direct current source 8, and generates a high frequency output, which is supplied to a discharge tube 1 through a tank coil 2 and capacitor 3.

On the other hand, the direct current less than 10 mA is applied from a direct current source 7 through a choke coil 4 to the discharge tube 1 to cause the glow discharge. The choke coil 4 serves to prevent the high frequency current from flowing into the direct current source 7. The high frequency current is shortcircuited by the capacitor 9 and not permitted to flow into the direct current source 7 even if its portion passes through the choke coil 4 by any chance. Further, the capacitor 3 prevents the direct current source 7 from flowing into a high frequency circuit.

The discharge tube 1 in FIG. 2 is provided with a tubing 11 comprising a tubular sealed glass. The tubing 11 has its one end portion connected to an anode lead 16 and a cathode lead 17. An insulating plate 14 is provided between the leads 16 and 17 in the tubing 11, which are covered with insulating tubes 18 and 19. Inactive gas such as argon gas or neon gas is enclosed in the discharge tube 1 at a pressure of several Torrs.

The anode and cathode have their discharging surfaces arranged in a parallel relation. A pair of electrodes are preferably two parallel plates having the same curvature or two concentric cylinders. In this embodiment, the anode 12 and the cathode 13 are formed to be angular plates and arranged to be parallel to each other. Thus, the electrodes are suitably arranged to cause two kinds of discharges. The two kinds of discharges do not occur efficiently in such an arrangement that a ring anode is disposed on the upper portion of the hollow cathode as is often the case with the conventional hollow cathode lamps. The cathode is formed from materials containing a metal from which the required atomic spectrum is emitted, or by connecting a desired metal to the surface of the plate.

The operation of the circuit in FIGS. 1A and 1B causes the high frequency and direct current powers to be supplied to the electrodes 12 and 13 of the discharge tube 1 in an overlying relation to effect a hybrid discharge containing the direct current and high frequency between both the electrodes. An emission with high brightness can be obtained when the sputtered atoms generated by the direct current glow discharge is excited by the high frequency. When, for example, the direct current of 5 mA and the high frequency power of 3 to 7 watts are applied to the discharge tube for copper, the brightness of a copper bright line generated from the discharge tube 1 is 30 to 100 times as great as that obtained only by a direct current discharge.

Figure 3:
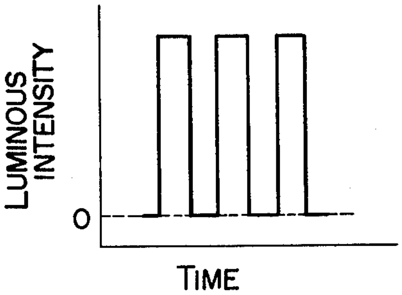
FIG. 3 is an illustrative view showing a luminous state obtained when the high frequency power is continuously applied to the electrodes of the discharge tube with the intermittent supply of the direct current power.

The intermittent supply of the direct current to the electrodes of the discharge tube at a state in which the high frequency discharge is maintained makes it possible to generate the alternately appearing emission and interruption of the atomic spectrum as shown in FIG. 3. That is, the atomic spectrum can be emitted only when the two discharges are made. As a result, one hundred percent of modulation can be obtained. The emission of the atomic spectrum is interrupted due to the interruption of the sputtering when the direct current is prevented from flowing while maintaining the high frequency discharge between the anode and cathode. It, however, appears as if the discharge tube is operated normally when viewed with the naked eye because the emission of the enclosed gas is maintained. The intermittence of the direct current is effected by connecting a modulator 410 including switching elements (transistors, SCR and the like) to the direct current source 7 as shown in FIG. 1B.

This modulation in which the direct current is intermittent is very easy because the small current is only intermittent. The light source of a luminosity meter for the atomic light absorption is modulated at the frequency of several tens to several hundreds Hz to make a lock-in amplification of signals from a detector, thereby avoiding flame noise or other noise and ensuring measurement with a high signal to noise ratio. In this method the atoms are made luminous only during the time when they exist between the electrodes as atoms sputtered by the direct current, so that the atoms cannot follow a very rapid modulation.

Figure 4:
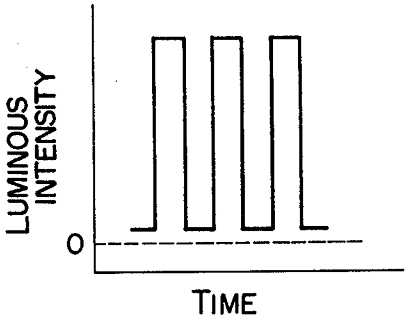
FIG. 4 is an illustrative view showing a luminous state obtained when the direct current power is continuously supplied to the electrodes of the discharge tube with the intermittent supply of the high frequency power.

On the other hand, the intermittent supply of the high frequency power to the discharge tube at a state during which the direct current discharge is maintained leads to such an emission as shown in FIG. 4. The two discharges cause high luminous intensity, but the emission is obtained due to the atoms excited by a direct current component when the high frequency discharge is interrupted. The luminous intensity due primarily to the direct current is very small as apparent from FIG. 4. The brightness due to the intermittence fluctuates between one and one hundred by a ratio of one to one hundred of brightness of the atomic spectral lines obtained when the high frequency power is intermitted. As a result, 99 percent of modulation is obtained.

The method for making the high frequency current supplied to the discharge tube intermittent is as follows: as shown in FIG. 1A, the direct current voltage supplied to the oscillator at the terminals 5 and 6 from the direct current source 8 is made intermittent by a modulator 400 including the switching elements (transistors, SCR or the like). The high frequency current is also made intermittent according to the intermittent state of the supplied direct current voltage.

In the modulation method in which the above-mentioned high frequency power is intermittent, the atoms at the cathode sputtered by the direct current discharge continuously maintained exist between the electrodes so as to be always constant. It is, therefore, possible to make a very rapid modulation. In this case, the upper limit of the modulation frequency is limited by the relaxation time of the electrons. The relaxation of the electron comprises the relaxation due to the collision of atoms and that due to their disappearance at the wall of the tube because of the diffusion. A brightness modulation of about 10 MHz is possible in normal conditions under which the lamp is switched on.

The discharge tube according to the present invention makes possible stabilized rapid modulation and spectral emission due to an extremely short pulse, so that it can be used also as a light source for time resolved measurements. In the abovementioned embodiment, the direct current supplied is only one tenth to one hundredth times as small as that in the conventional hollow cathode lamps when the same brightness is required.

Figure 5:
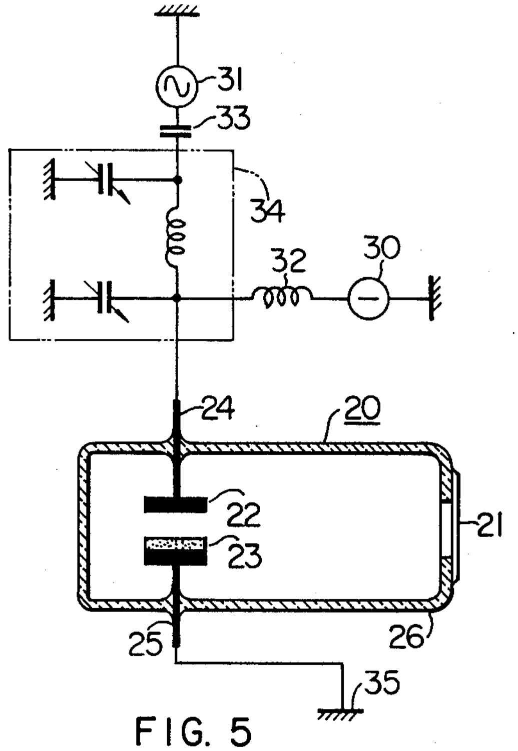
FIG. 5 is a schematic view showing the structure of another embodiment according to the present invention.

FIG. 5 is a schematic view of another embodiment. Argon gas is enclosed in a tubing 26 of a discharge tube 20. The tubing 26 is provided at its end portion with a light taking-out window 21, and connected at its side wall to leads 24 and 25. An anode 22 and a cathode 23 are both in the form of a plate and arranged in such a manner that the discharging surfaces are disposed in a parallel and opposing relation. The cathode 23 has its surface connected to a metal to be sputtered in order to emit a desired atomic spectrum.

The anode 22 is connected to a direct current source 30 and a high frequency source 31 through a lead line 24. The direct current 30 is electrically isolated from the high frequency source 31 by a choke coil 32 for preventing the flow of the high frequency and a capacitor for preventing the flow of the direct current. The choke coil 32 for preventing the flow of the high frequency, therefore, has reactance great enough for the frequency of the high frequency power, while the capacitor 33 for preventing the flow of the direct current has sufficiently great capacitance. An impedance matching circuit 34 serves to match the impedance at the time of the discharge and the output impedance of the high frequency source 31. The impedance of the discharge tube changes to some extent, depending on the state of the direct current discharge. This, however, can be adjusted by the matching circuit. On the other hand, the cathode 23 is connected through the lead 25 to a source whose potential is lower than that of the anode 22. In this embodiment, it is earthed.

Figure 6:
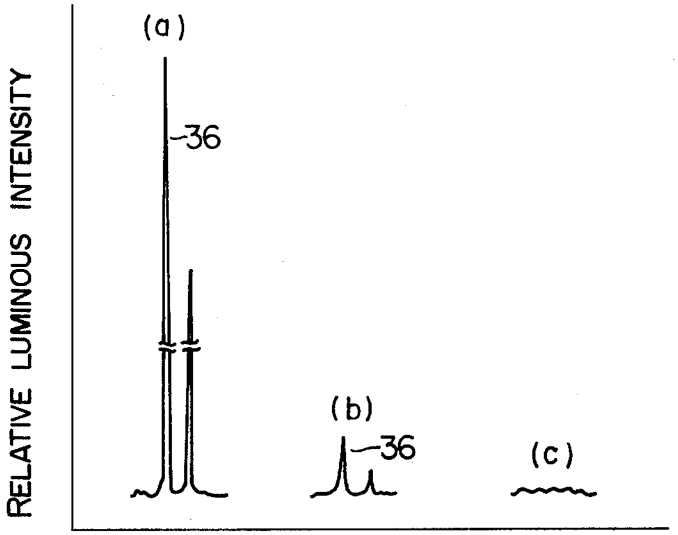
FIG. 6 is a view showing an example of experimental results obtained in using the light source device of FIG. 5.

The amount of atoms to be sputtered by the glow discharge, that is, the atomic density in the neighborhood of the cathode 23 is substantially proportional to the direct current. The discharge tube 20 is supplied with a discharge power of about several Watts. The electrons in the plasma in the discharge tube are so strongly accelerated by the high frequency current that they collide with the atoms generated by the sputtering and make the atoms strongly luminous. The amount of the current supplied from the direct current source 30 can be adjusted by a current adjusting means not shown in order to adjust the atomic density in the neighborhood of the cathode 23. Further, the amount of power from the high frequency source 31 can be adjusted by an adjusting means not shown to adjust the luminous intensity of the atomic spectrum without changing the sputtering. In FIG. 6 there are shown the results of the experiment in which aluminum is made luminous by supplying a direct current of 180 V, 3 mA and a high frequency power of 50 MHz, 1W to a light source device according to the embodiment of FIG. 5. A peak 36 shows a luminous line of aluminum 3964Å. (a) shows a relative luminous intensity when both the direct current and high frequency are supplied to the electrodes of the discharge tube; (b) when only the direct current is supplied thereto and (c) when only the high frequency is supplied. In (c) only the emission of the enclosed gas can be observed without the luminous line corresponding to the cathode material. In (a) the luminous intensity is about 20 times as great as that of (c) with the result of a great increase in absorption sensitivity in analyzing the atomic light absorption.

In the present invention, the self-absorption does not occur and the electrodes develop no heat at the same time because the atoms are made luminous efficiently by the low power. Luminous lines with a small spectral width can be, therefore, obtained as shown in FIG. 6 although the luminous intensity becomes great. Further, the present invention can provide the discharge tube with a very simple structure of electrodes in comparison with the conventional hollow cathode lamps. Further, enlarged use is provided because the elements to be used are not limited only to metals with a low melting point as in the conventional non-polar discharge lamps.

Figure 7:
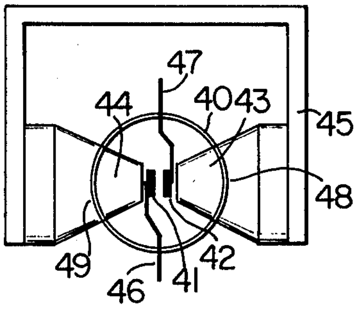
FIG. 7 is a schematic view showing the structure of still another embodiment according to the present invention.

FIG. 7 is a schematic view of another embodiment according to the present invention. An inactive gas is enclosed in a cylindrically sealed tubing 40. An anode 41 and a cathode 42 are connected to leads 46, 47 inserted from the side wall of the tubing 40. A magnet 45 for applying a magnetic field to the discharge tube is so arranged that it sandwiches the tubing. The magnet 45 is detachably mounted at contacts 48 and 49 relative to the tubing. Pole pieces 43 and 44 are inserted from the side wall of the tubing 40. The anode 41 and cathode 42 are arranged at a gap defined by the magnetic surface of the two pole pieces. The leads 46 and 47 are connected to the electrical circuit as shown in FIG. 1 or 5.

In this embodiment, the direct current power and high frequency power are supplied to the electrodes of the discharge tube in a superimposing relation to form a strong magnetic field on the order of 10 kilo Gauss. The luminous lines generated by the excitation of sputtered atoms are, respectively, branched into plural Zeemann lines by the magnetic field. One of the plural lines branched from the same luninous line is used as a light sampling flux and the other one or two lines as a reference light flux to make possible the atomic light absorption analysis with very high precision. In this embodiment, also, a pair of electrodes are used as the electrode for the direct current and high frequency, thereby permitting the sputtered atoms to be excited efficiently. The luminous state is often influenced by the strong magnetic field, but stabilized in the embodiment of FIG. 7 because the electrons fly between the electrodes parallel to the direction of the magnetic field.

We claim:

1. An atomic spectrum light source device comprising a discharge tube in which an inactive gas is enclosed and which has a light taking-out window, an anode and a cathode arranged in said discharge tube, at least one of said anode and cathode including an element for emitting at least one required atomic spectrum, a first electric source for supplying to said anode and cathode a low frequency power whose alternating period is longer than a flight time of ions between said anode and cathode to generate atoms of said element by sputtering due to a glow discharge from said at least one of said anode and cathode, and a second electric source for supplying a high frequency power to said anode and cathode to excite said sputtered atoms.

2. An atomic spectrum light source device according to claim 1, wherein said low frequency power comprises a direct current power.

3. An atomic spectrum light source device according to claim 1, wherein the generation and the excitation of the atoms are controlled independently.

4. An atomic spectrum light source device according to claim 1, wherein said high frequency power has a frequency such that ion entrapment occurs.

5. An atomic spectrum light source device comprising a discharge tube in which an inactive gas is enclosed and which has a light taking-out window, an anode and a cathode arranged in said discharge tube, at least one of said anode and cathode including an element for emitting at least one required atomic spectrum, a first electric source for supplying to said anode and cathode a low frequency power whose alternating period is longer than a flight time of ions between said anode and cathode to generate atoms of said element by sputtering due to a glow discharge from said at least one of said anode and cathode, a second electric source for supplying a high frequency power to said anode and cathode to excite said sputtered atoms, means for preventing current from flowing from said second electric source into said first electric source, and means for preventing current from flowing from said first electric source into said second electric source.

6. An atomic spectrum light source device according to claim 5, further comprising means for making intermittent the supply of the low frequency power to said anode and cathode while maintaining the supply of the high frequency power thereto.

7. An atomic spectrum light source device according to claim 5, further comprising means for making intermittent the supply of the high frequency power to said anode and cathode while maintaining the supply of the low frequency power thereto.

8. An atomic spectrum light source device according to claim 5, wherein the discharge surface of said anode runs parallel with the discharge surface of said cathode.

9. An atomic spectrum light source device according to claim 8, wherein said anode and cathode are comprised of plate electrodes parallel to each other.

10. An atomic spectrum light source device according to claim 5, wherein a choke coil is used as said means for preventing the high frequency current and a capacitor is used as said means for preventing the direct current.

11. An atomic spectrum light source device according to claim 5, wherein the generation and the excitation of the atoms are controlled independently.

12. An atomic spectrum light source device according to claim 5, wherein said high frequency power has a frequency such that ion entrapment occurs.

13. An atomic spectrum light source device comprising a discharge tube in which an inactive gas is enclosed and which has a light taking-out window, an anode and a cathode arranged in said discharge tube, at least one of said anode and cathode including an element for emitting at least one required atomic spectrum, a first electric source for supplying to said anode and cathode a low frequency power whose alternating period is longer than a flight time of ions between said anode and cathode to generate atoms of said element by sputtering due to a glow discharge from said at least one of said anode and cathode, a second electric source for supplying a high frequency power to said anode and cathode to excite said sputtered atoms, and a magnet for sandwiching said anode and cathode to define a magnetic gap therebetween and to split an emitted luminous line into plural lines by Zeeman effect.

14. An atomic spectrum light source device according to claim 13, wherein the generation and the excitation of the atoms are controlled independently.

15. An atomic spectrum light source device according to claim 9, wherein said high frequency power has a frequency such that ion entrapment occurs.

* * * * *